US011856226B2

(12) United States Patent
Ross

(10) Patent No.: US 11,856,226 B2
(45) Date of Patent: Dec. 26, 2023

(54) MULTI-PASS COMPRESSION OF UNCOMPRESSED DATA

(71) Applicant: Groq, Inc., Mountain View, CA (US)

(72) Inventor: Jonathan Alexander Ross, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 465 days.

(21) Appl. No.: 17/195,370

(22) Filed: Mar. 8, 2021

(65) Prior Publication Data

US 2021/0195244 A1 Jun. 24, 2021

Related U.S. Application Data

(63) Continuation of application No. 16/560,819, filed on Sep. 4, 2019, now Pat. No. 10,965,957, which is a
(Continued)

(51) Int. Cl.
| | |
|---|---|
| *G06K 9/00* | (2022.01) |
| *H04N 19/625* | (2014.01) |
| *G06N 3/08* | (2023.01) |
| *H04N 19/103* | (2014.01) |
| *H04N 19/20* | (2014.01) |
| *G06N 3/045* | (2023.01) |
| *G06N 3/084* | (2023.01) |

(52) U.S. Cl.
CPC .......... *H04N 19/625* (2014.11); *G06N 3/045* (2023.01); *G06N 3/08* (2013.01); *H04N 19/103* (2014.11); *H04N 19/20* (2014.11); *G06N 3/084* (2013.01)

(58) Field of Classification Search
CPC .... H04N 19/625; H04N 19/103; H04N 19/20; G06N 3/045; G06N 3/08; G06N 3/084
See application file for complete search history.

(56) References Cited

U.S. PATENT DOCUMENTS

| | | | |
|---|---|---|---|
| 6,587,583 B1 * | 7/2003 | Kurzweil | ............... H04N 1/644 |
| | | | 382/164 |
| 2003/0235341 A1 * | 12/2003 | Gokturk | .................. G06T 9/001 |
| | | | 382/173 |

(Continued)

OTHER PUBLICATIONS

Simard, Patrice Y., et al. "A foreground-background separation algorithm for image compression." Data Compression Conference, 2004. Proceedings. DCC 2004. IEEE, 2004. (Year: 2004).*
(Continued)

*Primary Examiner* — Avinash Yentrapati
(74) *Attorney, Agent, or Firm* — Amin, Turocy & Watson, LLP

(57) ABSTRACT

Introduced here is a technique to create small compressed image files while preserving data quality upon decompression. Upon receiving an uncompressed data, such as an image, a video, an audio, and/or a structured data, a machine learning model identifies an object in the uncompressed data such as a house, a dog, a text, a distinct audio signal, a unique data pattern, etc. The identified object is compressed using a compression treatment optimized for the identified object. The identified object, either before or after the compression, is removed from the uncompressed data. The uncompressed data with the identified object removed is compressed using a standard compression treatment.

20 Claims, 11 Drawing Sheets

Related U.S. Application Data continuation of application No. 15/658,672, filed on Jul. 25, 2017, now Pat. No. 10,448,054.

(60) Provisional application No. 62/444,955, filed on Jan. 11, 2017.

(56) References Cited

U.S. PATENT DOCUMENTS

| | | | | |
|---|---|---|---|---|
| 2007/0230810 A1* | 10/2007 | Kanatsu | ............... | G06V 30/413 382/173 |
| 2010/0027686 A1* | 2/2010 | Zuo | ...................... | H04N 19/187 382/233 |
| 2016/0105586 A1* | 4/2016 | Oki | ...................... | G06V 30/413 358/2.1 |

OTHER PUBLICATIONS

Simard, P.Y. et al., "A Foreground/Background Separation Algorithm for Image Compression," Data Compression Conference, Mar. 2004, pp. 1-10.

United States Office Action, U.S. Appl. No. 15/658,672, dated Dec. 27, 2018, six pages.

United States Office Action, U.S. Appl. No. 16/560,819, dated Jul. 31, 2020, eight pages.

* cited by examiner

MULTI-PASS COMPRESSION OF UNCOMPRESSED DATA

CROSS-REFERENCE TO RELATED APPLICATION(S)

This application is a continuation of co-pending U.S. patent application Ser. No. 16/560,819 filed Sep. 4, 2019 titled "MULTI-PASS COMPRESSION OF UNCOMPRESSED DATA" which is a continuation of U.S. patent application Ser. No. 15/658,672, titled "MULTI-PASS COMPRESSION OF UNCOMPRESSED DATA" and filed on Jul. 25, 2017, now bearing U.S. Pat. No. 10,448,054, issued Oct. 15, 2019, which claims priority to U.S. Provisional Patent Application No. 62/444,955 titled "MULTI-PASS COMPRESSION OF UNCOMPRESSED DATA," and filed on Jan. 11, 2017, both of which are incorporated by reference herein in their entireties.

TECHNICAL FIELD

The present application is related to compression, and more specifically to methods and systems that compress uncompressed data using a multi-pass compression.

BACKGROUND

Standard image, video, and audio compression techniques may be lossy or lossless. A lossy compression creates a smaller compressed file than the compressed file created by a lossless compression. However, when uncompressed, the compressed file created by the lossless compression suffers from artifacts. For example, when compressing an image or a video, lossy compression results in visual artifacts such as edge blurring.

SUMMARY

Introduced here is a technique to create small compressed image files while preserving data quality upon decompression. Upon receiving an uncompressed data, such as an image, a video, an audio, and/or a structured data, a machine learning model identifies an object in the uncompressed data such as a house, a dog, a text, a distinct audio signal, a unique data pattern, etc. The identified object is compressed using a compression treatment optimized for the identified object. The identified object, either before or after the compression, is removed from the uncompressed data. The uncompressed data with the identified object removed is compressed using a standard compression treatment.

For example, the uncompressed data can be an image including a text, and a house. The text and the house in the image are identified using a neural network. The text is compressed using an ASCII encoding, while the house is compressed using a discrete cosine transform. In addition to the ASCII encoding, the compressed text includes information regarding position of the text in the image, parallax of the text (i.e. the depth of the text in the image), font of the text, and orientation of the text. Upon removing the text and the house from the uncompressed data, the uncompressed background is compressed using a standard compression treatment such as MPEG, JPEG, VC-2, H.265 etc.

The compressed identified object and the compressed data with the identified object removed are decompressed using an appropriate decoder. Because each object receives a compression treatment uniquely suited to the individual object, the resulting compressed file has a small size, and upon decompression, the decompressed data does not suffer from compression artifacts. The techniques described herein can be used in both lossy and lossless compression.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
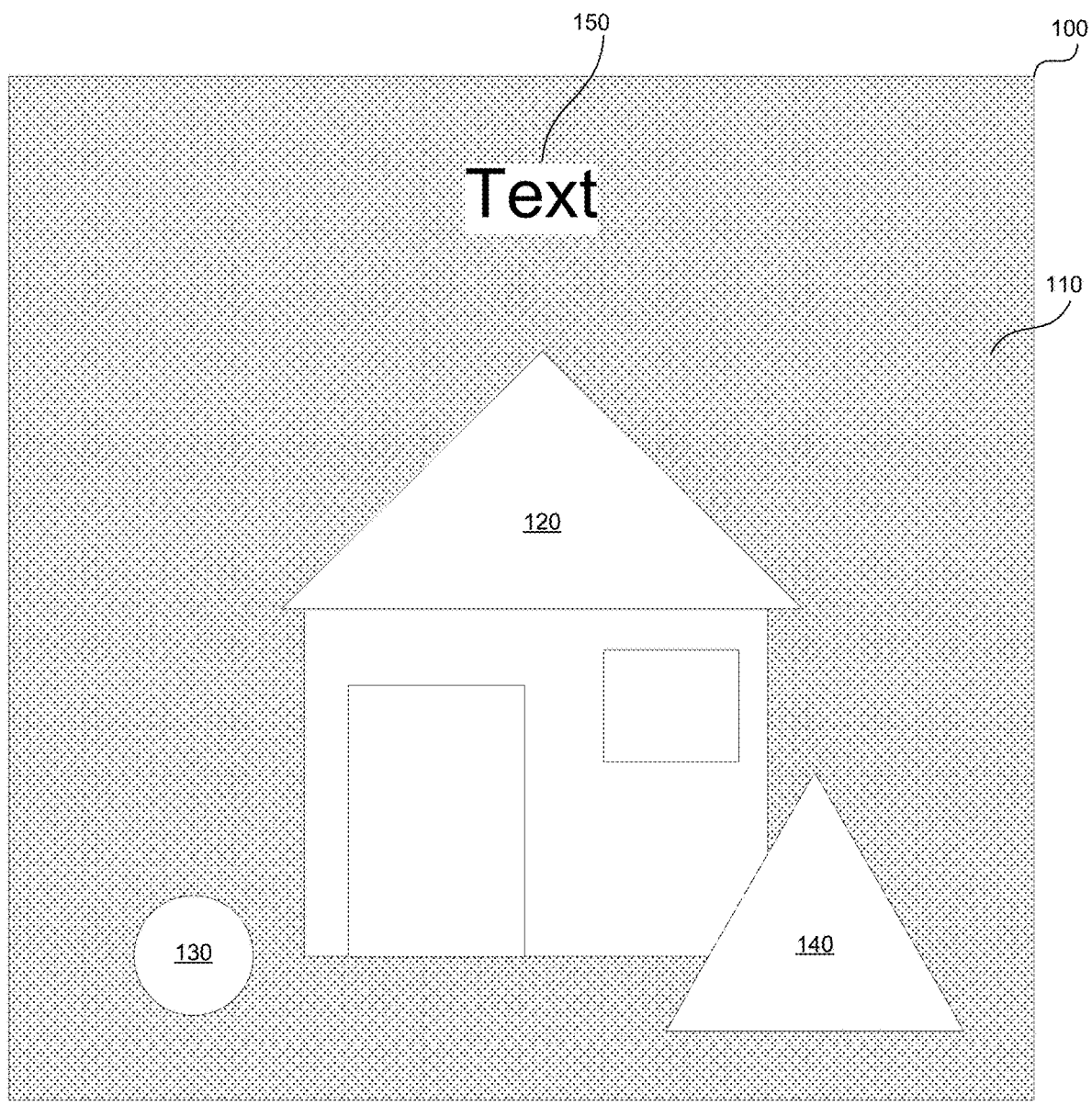
FIG. 1 shows an uncompressed data, such as an image, according to one embodiment.

Brief definitions of terms, abbreviations, and phrases used throughout this application are given below.

Reference in this specification to "processor" means any processing element capable of executing instructions such as a central processing unit (CPU), a graphics processing unit (GPU), a tensor processing unit (TPU), an application-specific integrated circuit (ASIC), or any combination of these.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Technology

Introduced here is a technique to create small compressed image files while preserving data quality upon decompression. Upon receiving an uncompressed data, such as an image, a video, an audio, and/or a structured data, a machine learning model identifies an object in the uncompressed data such as a house, a dog, a text, a distinct audio signal, a unique data pattern, etc. The identified object is compressed using a compression treatment optimized for the identified object. The identified object, either before or after the compression, is removed from the uncompressed data to obtain an uncompressed background. The uncompressed background is compressed using a standard compression treatment.

For example, the uncompressed data can be an image including a text, and a house. The text and the house in the image are identified using a neural network. The text is compressed using an ASCII encoding, while the house is compressed using a discrete cosine transform. In addition to the ASCII encoding, the compressed text includes information regarding position of the text in the image, parallax of the text (i.e. the depth of the text in the image), font of the text, and orientation of the text. Upon removing the text and the house from the uncompressed data, the uncompressed background is compressed using a standard compression treatment such as MPEG, JPEG, VC-2, H.265 etc.

The compressed identified object and the compressed background are decompressed using an appropriate decoder. Because each identified object receives a compression treatment uniquely suited to the individual object, the resulting compressed file has a small size, and upon decompression, the decompressed data does not suffer from compression artifacts. The techniques described herein can be used in both lossy and lossless compression.

Compressing an object reduces the object to the essential components that differentiate the object from noise. For example, when compressing an image of a face, the face usually has two eyes. Storing eye colors rather than pixels representing the ice takes up less space in the compressed form.

FIG. 1 shows an uncompressed data, such as an image, according to one embodiment. The uncompressed data can be an image 100, a video, a collection of 3-dimensional objects, an audio, a structured data etc. In FIG. 1 the uncompressed data is the image 100. The image 100 can include a background 110, and one or more objects 120, 130, 140, 150. The objects can be shapes 120, 130, 140, or text 150. In FIG. 1 the shapes are a house 120, a sphere 130, and a triangle 140. A multi-pass compression treatment is applied to the image to produce a compressed image of smaller size then the input image.

Figure 2A:
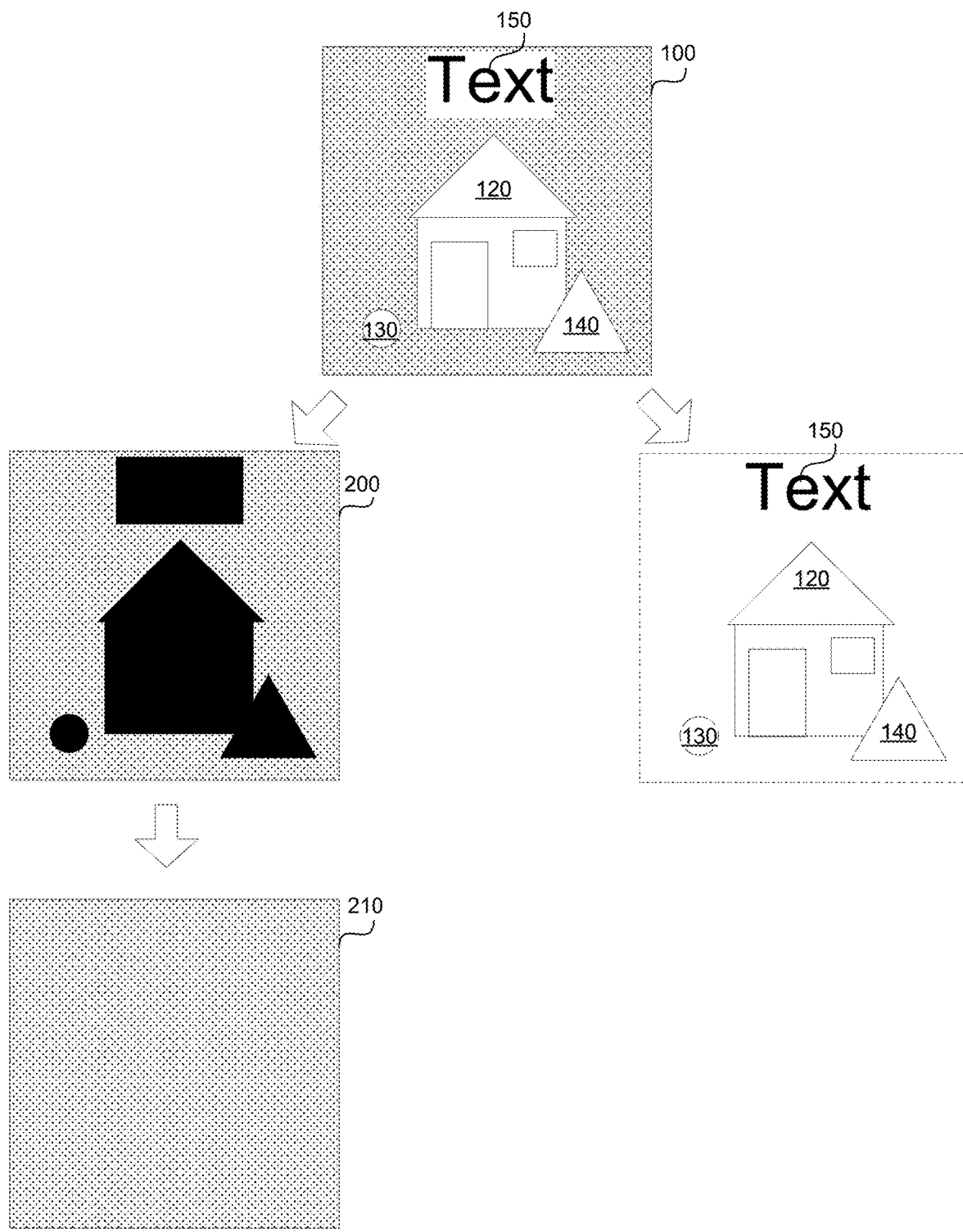
FIGS. 2A-2B show a step in the multi-pass compression treatment, according to various embodiments.
Figure 2B:
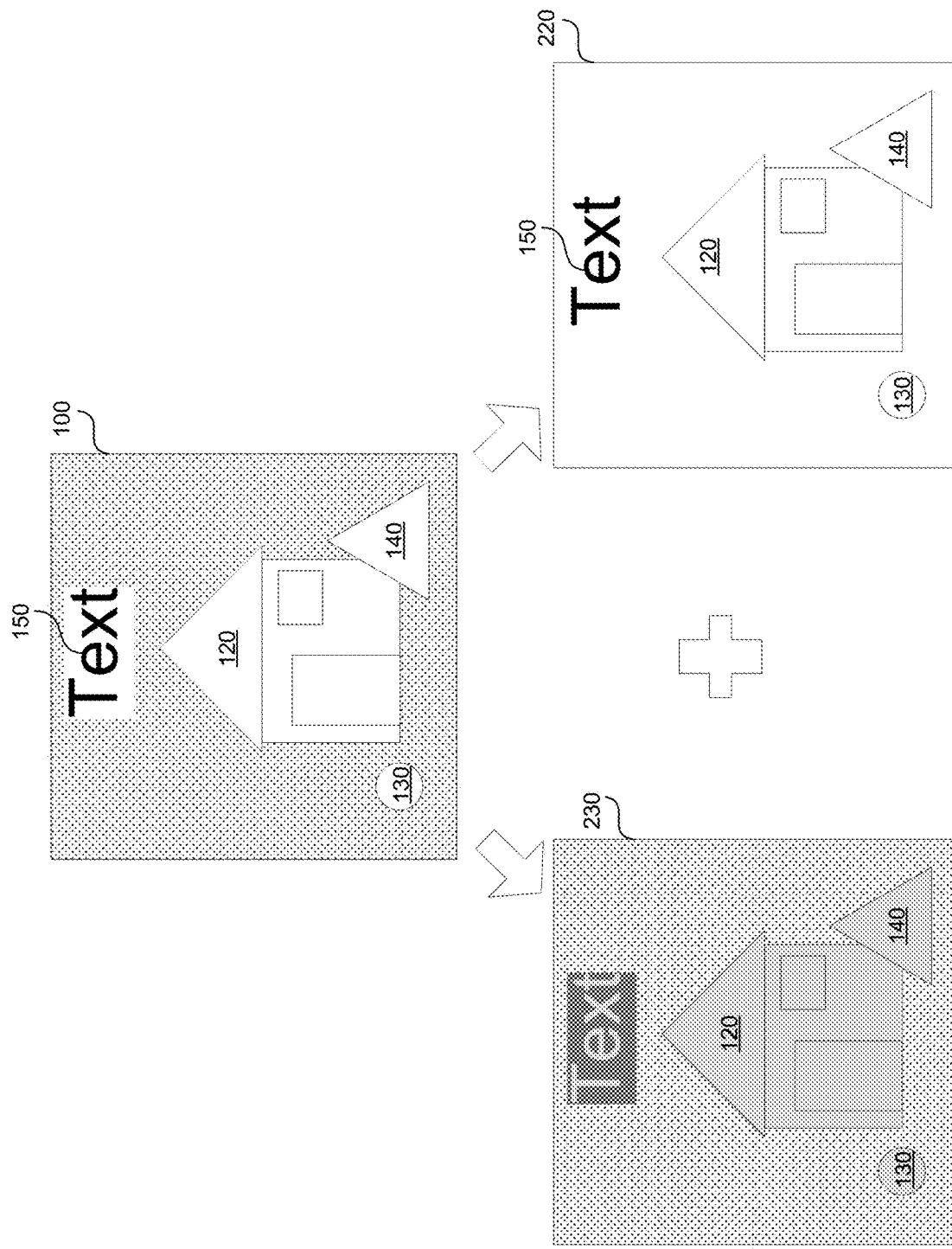

FIGS. 2A-2B show a step in the multi-pass compression treatment, according to various embodiments. Machine learning algorithm, such as a neural net, running on at least one processor, identifies the objects 120, 130, 140, 150 in the input image 100. The objects 120, 130, 140, 150 are removed from the input image 100. The removal can be done in different ways, as described herein.

In FIG. 2A, once the objects 120, 130, 140, 150 are identified, the objects 120, 130, 140, 150 are removed from the input image 100 to obtain a background with gaps 200. The background with gaps 200 is reconstructed in the places where the objects 120, 130, 140, 150 were positioned to obtain a smooth background 210. The reconstruction can be done using interpolation, flood filling, in-painting, iterative reconstruction, or other image completion algorithms to obtain a smooth background 210 as shown in FIG. 2A. Different compression treatments can be applied to the background 210, and to the objects 120, 130, 140, 150. The background 210 can be compressed using standard compression techniques such as MPEG, JPEG, VC-2, H.265 etc. A compression treatment for the objects 120, 130, 140, 150 is selected based on the type of the object, to produce minimal compressed file size with best image quality.

In FIG. 2B, once the objects 120, 130, 140, 150 are identified, the objects are 120, 130, 140, 150 are compressed, and decompressed to obtain a decompressed foreground image 220. To remove the objects 120, 130, 140, 150 from the input image 100, the decompressed foreground image 220 is multiplied by a linear multiple, and subtracted from the input image 100 to obtain the background image

230. As described above, different compression treatments can be applied to the background 230, and to the objects 120, 130, 140, 150. The background 230 can be compressed using standard compression techniques such as MPEG, JPEG, VC-2, H.265 etc. A compression treatment for the objects 120, 130, 140, 150 is selected based on the type of the object, to produce minimal compressed file size and best image quality.

Figure 3:
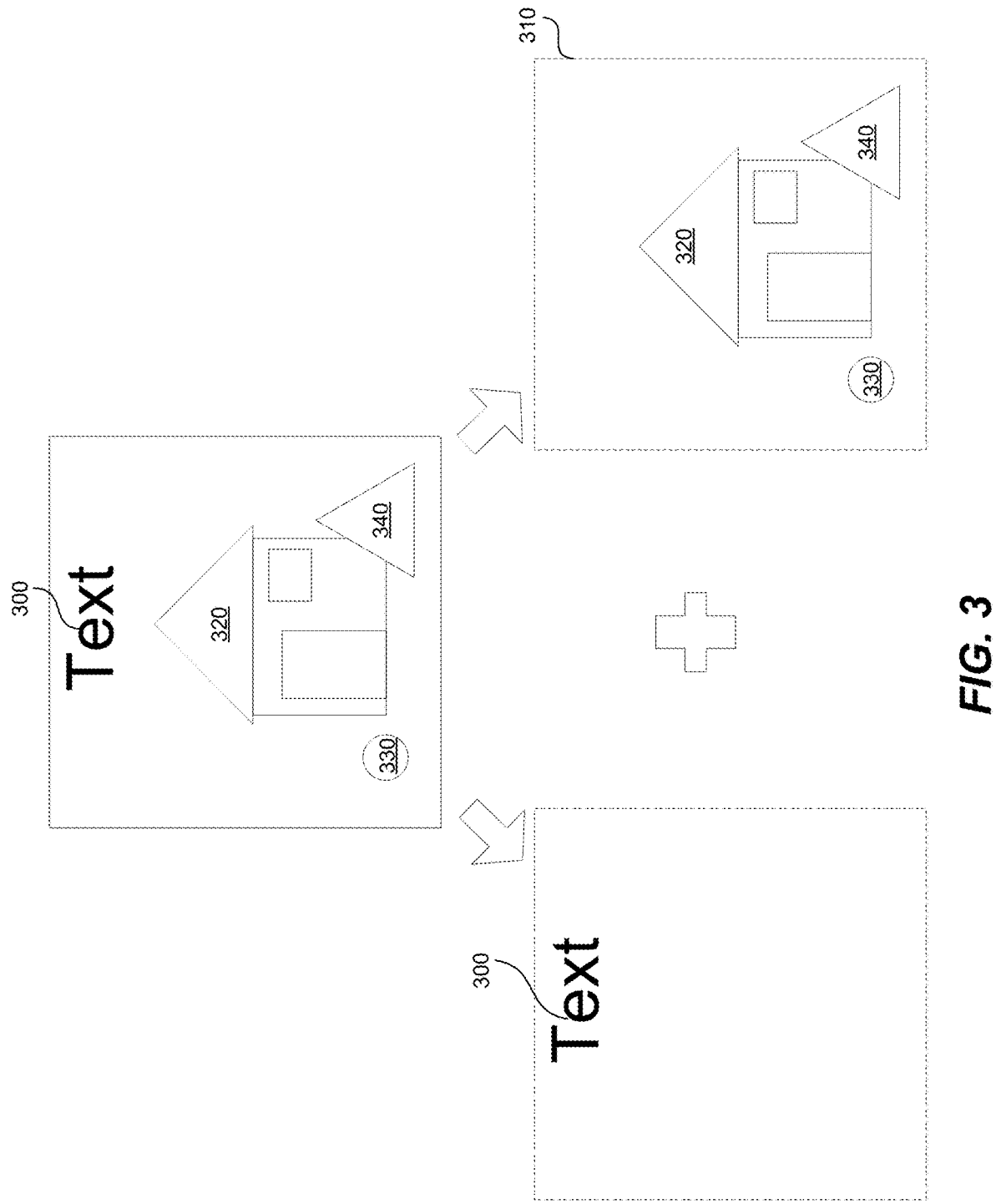
FIG. 3 shows categorization of the objects for various compression treatments, according to one embodiment.

FIG. 3 shows categorization of the objects for various compression treatments, according to one embodiment. The objects can be divided into text 300, and shapes 310. Text 300 can be compressed in a different manner from shapes 310.

The objects 300, 320, 330, 340 can be automatically identified as text and/or shapes by a machine learning model. The objects 300, 320, 330, 340 in the uncompressed data that are least compressed, but most similar, can have a single machine learning model trained to autoencode the objects 300, 320, 330, 340.

To compress text 300, at least one processor runs an optical character recognition method, and stores the recognized text into an American Standard Code for Information Interchange (ASCII) encoded text. In addition to the ASCII encoding, the compressed text includes information regarding position of the text in the uncompressed data, parallax of the text (i.e. the depth of the text in the uncompressed data), font of the text, and orientation of the text. The optical character recognition can be performed using a machine learning method, such as a neural network.

The ASCII encoded text takes significantly less memory then text represented as an image, because ASCII encoded text can take up 7 bits, 8 bits, 16 bits, or 32 bits per character. By contrast, when text is stored as an image, the image can take a megabyte per character, or more, depending on the size of the character.

In addition to the smaller file size, the ASCII encoded text produces sharper images when decompressed. Specifically, using standard JPEG compression the edges of any text displayed in the image upon decompression become blurry, and hard to read. Using the ASCII compression, the displayed text preserves the input image quality, or can even improve the input image quality. In other words, representing text using the ASCII encoding can actually make images clearer, e.g. can remove clutter or make clear a text that is difficult to read or discern.

To compress the shapes 310, the processor can run various compression algorithms such as discrete cosine transform (DCT), or a shaped DCT. The shaped DCT can be a rectangular DCT, a circular DCT, a DCT along arbitrarily specified contour, etc. Further, each of the recognized shapes such as a house 320, a sphere 330, a triangle 340, an actor (not pictured) can be compressed using an autoencoder. Autoencoding can be used before or after the DCTs are performed, or in-lieu of the DCT. More generally, any module and/or library can be used for compression, such as a machine learning model (e.g. an autoencoder, or any kind of machine learning model), and/or a compression software.

The optimal DCT for a given shape can initially be found by brute force, and later using a machine learning model trained on the various DCT's applied to various shapes. Specifically, in the brute force stage, variously shaped DCT's, and variously oriented DCT's are used to compress an object. Out of the various DCT compressions, DCT compression resulting in the smallest file size and best image quality is selected. The best image quality can be measured using least square difference between the input image and the decompressed image. The brute force stage can be a training stage for a machine learning model, and/or can be a brute force computation unrelated to the training of the machine learning model.

After optimal DCT's have been computed for various shapes, a machine learning model can be used to determine an optimal DCT for a new given shape based on the optimal DCT's and their corresponding shapes, without having to perform the brute force stage computation and/or training. For example, the new given shape is an egg, and we know that the optimal DCT for a ball is a DCT with parameters $b1, b2 \ldots bN$, where parameter $b1$ corresponds to the shape of the DCT. In the case of a ball, $b1$ is circular DCT. The optimal DCT for a rectangle is a DCT with parameters $r1, r2, \ldots rN$, where parameter $r1$ corresponds to the shape of the DCT. In the case of a rectangle, $r1$ is rectangular DCT. The machine learning model, without performing the brute force stage, can be trained to determine that the optimal DCT for the egg is a DCT with parameters $e1, e2, \ldots eN$, where parameters $e1$-$eN$ correlate to parameters $b1$-$bN$, and parameters $r1$-$rN$. The DCT parameters $e1$-$eN$ can be encoded in the compressed form representing the egg, so that the decompression can be performed without referencing the machine learning model used to create the compressed form.

To optimize the brute force stage, if a shape has been identified, such as a triangle, or a sphere, the brute force algorithm can only perform the brute force computer ration on a shaped DCT such that the shape of the DCT corresponds to the shape of the object. For example, if the identified object is a triangle, the brute force algorithm only performs the brute force computation a triangular DC. The brute force computation determines the optimal parameters $t2$-$tN$ associated with the triangular DCT, since $t1$ has been determined to be a triangular DCT.

Figure 4:
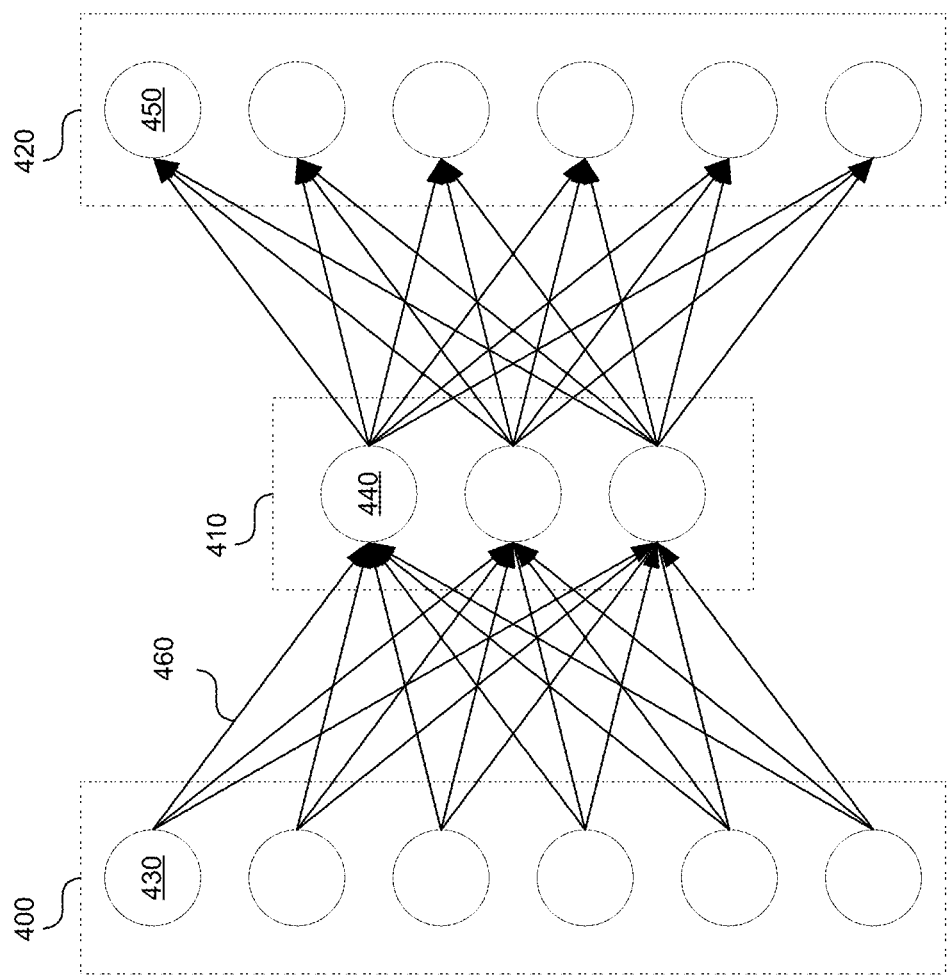
FIG. 4 is an autoencoder, according to one embodiment.

FIG. 4 is an autoencoder, according to one embodiment. An autoencoder is an artificial neural network used for unsupervised learning of efficient encodings. The aim of an autoencoder is to learn a representation, i.e. encoding for a set of data, typically for the purpose of dimensionality reduction.

The autoencoder includes the input layer 400, a compression layer 410, and a decoding layer 420. In other embodiments, each of the layers 400, 410, 420, can include two or more layers. Each layer includes one or more neurons, such as a neuron 430 in the input layer 400, a neuron 440 in the compression layer 410, a neuron 450 in the decoding layer 420. The number of neurons in the input layer 400 is the same as the number of neurons in the decoding layer 420. The number of neurons in the compression layer 410 is smaller than the number of neurons in the input layer 400.

Each neuron in the input layer 400 is connected to each neuron in the compression layer 410, and similarly each neuron in the compression layer 410 is connected to each neuron in the decoding layer 420. Neurons are connected via connections 460 (only one labeled for brevity), where each connection includes a weight, which is a scalar number.

The input layer 400 receives the input uncompressed data. For example, the neuron 430 receives a group of one or more pixels in the uncompressed data. The compression layer 410 represents the uncompressed data in a compressed form. The decoding layer 420 receives the compressed form from the compression layer 410, and decodes the compressed form to create a new uncompressed data closely resembling the input uncompressed data.

During training, the autoencoder is optimized to minimize the difference between the new uncompressed data and the input uncompressed data. To minimize the difference, at least one processor calculates the difference between the new uncompressed data in the input uncompressed data using a differencing method such as squared error. Once the difference between the new uncompressed data and input uncompressed data is calculated, the difference is back propagated through the neural network and weight updates are performed.

Figure 5A:
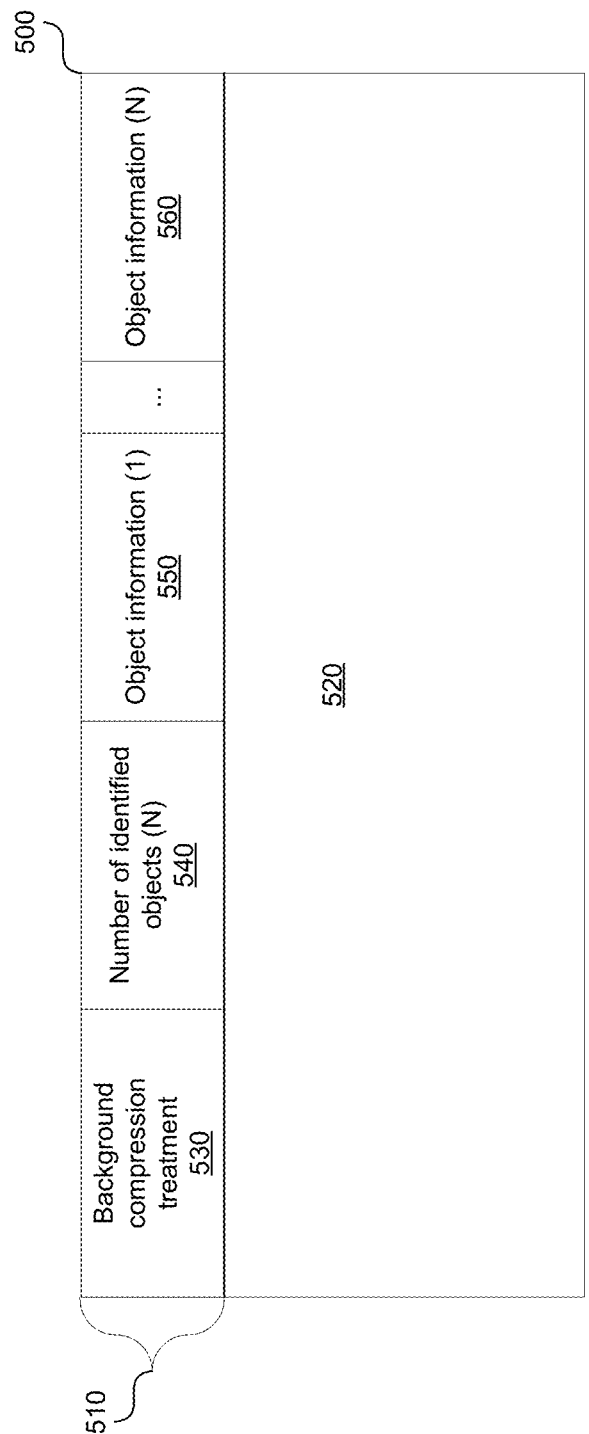
FIG. 5A shows a compressed form, according to one embodiment.

FIG. 5A shows a compressed form, according to one embodiment. The compressed form 500 is a file format including a header 510, and a compressed data 520 of the input uncompressed data. The header 510 includes information about the compressed data such as the compression treatment 530 applied to the uncompressed background, the number of identified objects in the compressed data 540, and object information 550, 560 for each of the identified objects.

Figure 5B:
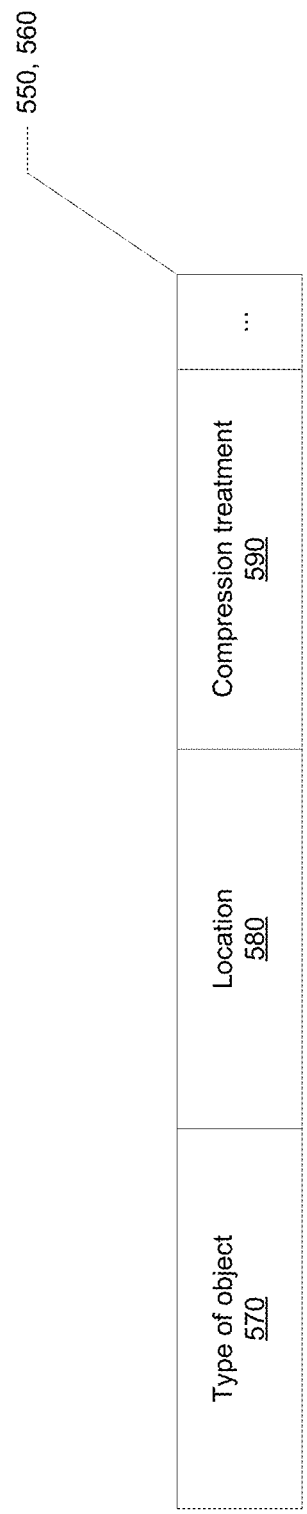
FIG. 5B shows the contents of the object information, according to one embodiment.

FIG. 5B shows the contents of the object information 550, 560, according to one embodiment. The object information 550, 560 can include information regarding the type of object 570, location of the compressed object 580, the compression treatment 590 applies to the object, etc. The type of object 570 can specify a house, a sphere, a triangle, a dog, a fire hydrant, a tree, a road, a street sign, etc. The location of the compressed object 580 specifies the location of the compressed object in the resulting image. For example, the location of the compressed object 580 can specify the upper left corner of the first pixel associated with the compressed object. The compression treatment 590 specifies the type of decoder associated with the first compression treatment to be used to decompress the compressed object. For example, the decoder can be a DCT decoder, a shaped DCT decoder, a decoder associated with an autoencoder, a background decoder, etc. The shaped DCT can be rectangular DCT, circular DCT, a DCT along arbitrarily specified contour, etc.

Figure 5C:
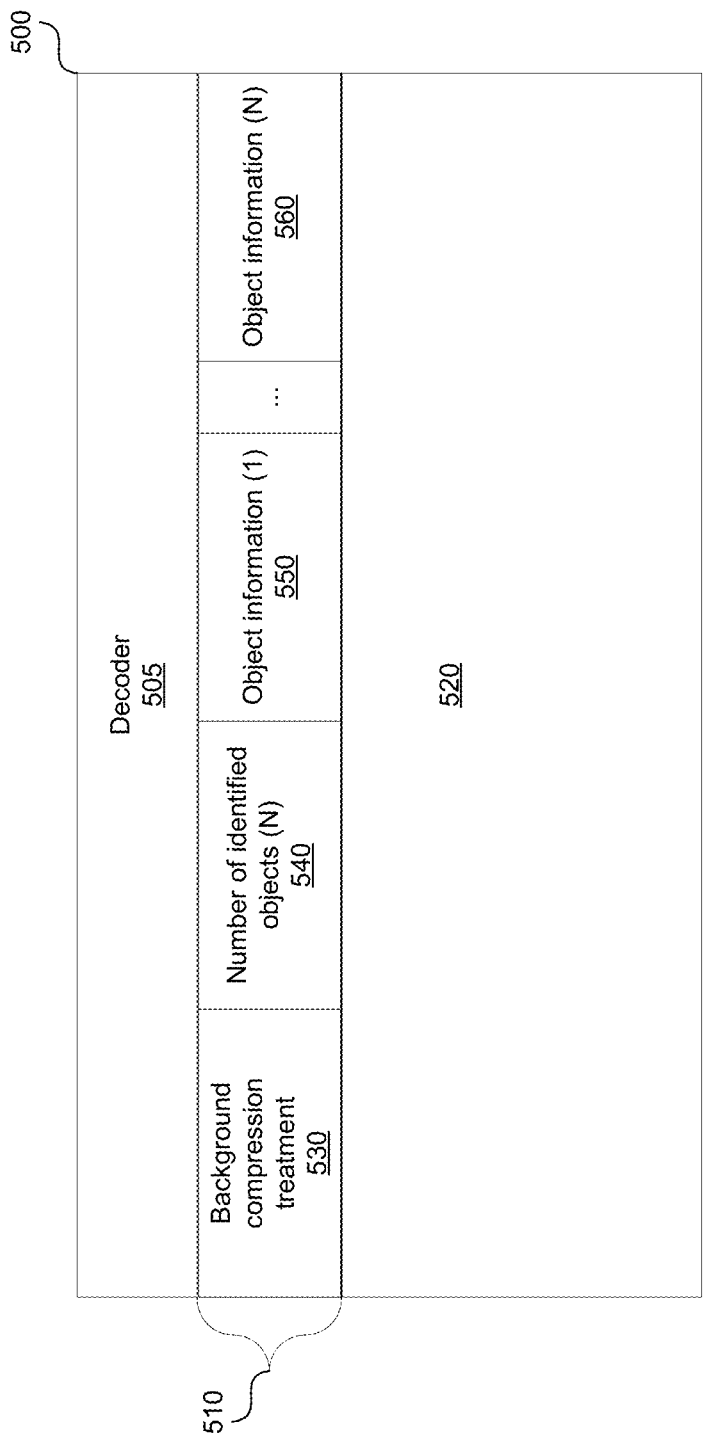
FIG. 5C shows the compressed form, according to another embodiment.

FIG. 5C shows the compressed form, according to another embodiment. The compressed form includes a decoder 505 associated with the compression treatment of the object contained in the object information 550, 560, and/or a decoder 505 associated with the compression treatment 530 applied to the uncompressed background. The decoder 505 can appear before the header 510, as shown in FIG. 5C, or can appear between the header 510 and the compressed data 520. The decoder 505 can be a browser extension. The decoder 505 can also be downloaded independent of the compressed form 500. For example, the decoder 505 can be distributed with the decoder API, can be downloaded as a browser extension, as part of an operating system, as a user application, etc. The decoder 505 can be downloaded just in time, before the object associated with the decoder 505 is downloaded and viewed.

In this application, the compression treatment of the object can be generated using an encoder, while decompression can be done using a decoder. The encoder can be an autoencoder, a DCT encoder, an ASCII encoder, etc. The decoder can be an autodecoder, a DCT decoder, an ASCII decoder, etc. Each encoder/decoder can have a unique identification (ID), and can be downloadable on demand. For example, for video compression an actor/actress that features often in movies watched on a device may have a dedicated encoder/decoder that resides on the device. A caching mechanism can keep most commonly seen encoders and/or decoders resident on the device, while other encoders and/or decoders are fetched on demand. A video or image can download the associated decoder for the object on demand, or prior to the need for the decoder.

In addition to video and/or images, text, medical data, etc. can use the technology described in this application. In one embodiment, DNA strands or other molecular/medical data can be compressed and stored relative to other, similar strands, molecular/medical data that are largely the same. As a result, only the difference between the particular DNA strand, molecular/medical data and the standard similar strand, molecular/medical data is stored. Based on the encoder/decoder ID, a database can be created containing shared resource based on IDs. Unique IDs may be translated like virtual addresses, and be customer specific.

Figure 6:
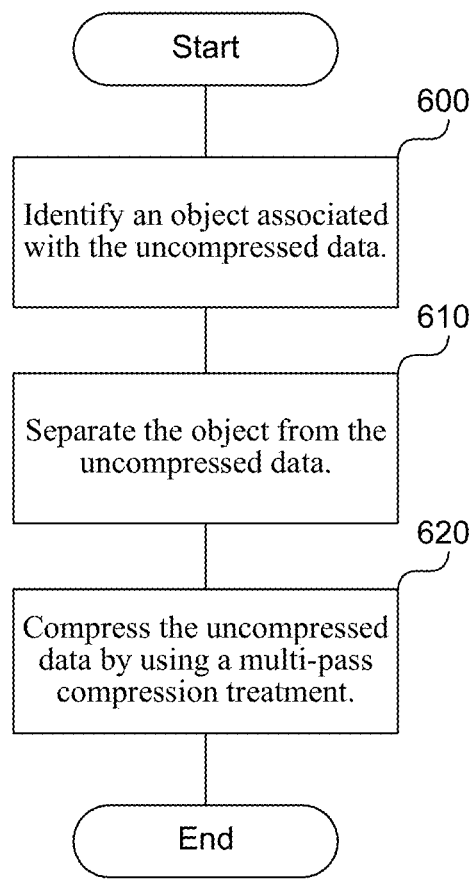
FIG. 6 is a flowchart of a method to efficiently compress an uncompressed data, according to one embodiment.

FIG. 6 is a flowchart of a method to efficiently compress an uncompressed data, according to one embodiment. The uncompressed data can be an image, a video, a collection of 3-dimensional objects, an audio, a structure data, etc. At least one processor receives the uncompressed data and performs the steps outlined below. The processor can implement a machine learning method, using software and/or hardware. The processor can be part of a neural network.

In step 600, an identification machine learning model identifies an object associated with the uncompressed data. The object can be any object that a human observer would identify. The object can be a shape or an alphanumeric character. For example, the shape can be a house, a tree, a sphere, a triangle, a person, a road, a fire hydrant, a car, etc. In a more specific example, the machine learning model can identify an actor in a movie. Upon identifying the actor, the processor retrieves a stored compression treatment for the image of the actor. The more specific the compression treatment to the actor the less residual artifacts will need to be compressed. The compression treatment can be a previously trained machine learning model optimized to compress the image of the actor, a DCT, a shaped DCT, etc.

In step 610, the processor separates the object from the uncompressed data to obtain an uncompressed background. The processor can separate the object from the uncompressed data in various ways.

In a first embodiment, the processor deletes the object from the uncompressed data to obtain an uncompressed background with gaps. The processor reconstructs the uncompressed background with gaps in areas from which the object was removed. The reconstruction can be performed using interpolation, flood filling, in-painting, iterative reconstruction, or other image completion algorithms. The processor then applies the second compression treatment to the reconstructed uncompressed background.

In a second embodiment, upon identifying the object, the processor deletes the object from the uncompressed data to obtain an uncompressed background with gaps. Instead of reconstructing the uncompressed background with gaps, as in the first embodiment, the processor calculates the DCT for parts of the uncompressed background where there are no gaps, and reuses the calculated DCTs for the parts of the background where there are gaps. No compression step is needed afterwards.

In a third embodiment, upon identifying the object, the processor applies the first compression treatment to the object. The processor, then, applies the first decompression treatment to the object to obtain a decompressed object. The processor subtracts the decompressed object from the uncompressed data to obtain the uncompressed background. The processor subtracts the decompressed object by multiplying the decompressed object by a linear multiple, and subtracting the results from the uncompressed data. In the example of the actor in the movie, the more specific the compression treatment to the actor the less residual artifacts remain in the uncompressed background that will need to be compressed. After the subtraction, the processor then applies the second compression treatment to the uncompressed background.

The compression treatment of the object can include multiple compression treatments. For example, the first compression treatment applied to an object identified as a person can use a generic machine learning compression model trained to compress a generic person. The generic machine learning compression model can be trained to compress a person of average height and/or average weight. The identified person in the uncompressed data can be a tall, overweight person. The generic machine learning compression model creates a compression of the identified person. The compression of the identified person is then decompressed to obtain a decompressed generic person. The decompressed generic person is subtracted from the uncompressed data to obtain the uncompressed background. The uncompressed background contains traces of the identified person, where the traces of the identified person are the difference between the generic person and the identified tall, overweight person.

The uncompressed background is then used as the uncompressed data input into the second pass of the compression treatment. Using the uncompressed background as the uncompressed data, the identification machine learning model identifies the traces of the identified person as a second identified person. The second identified person can then be compressed using the generic machine learning compression model, or a machine learning compression model specialized in compressing a tall, overweight person. Further, if the uncompressed data contains multiple people, using the generic machine learning compression model to compress the multiple people reduces the size of the compression treatments and decompression treatments because the information shared across the multiple people is encoded in the single generic machine learning compression model, without the need to create a specialized machine learning compression model for each person among the multiple people.

In step 620, the processor compresses the uncompressed data by using a multi-pass compression treatment. The processor applies a first compression treatment to the object, and applies a second compression treatment to the uncompressed background. The first compression treatment applied to the object can use an ASCII encoding, a standard DCT, a shaped DCT, autoencoding, etc. The shaped DCT can be rectangular DCT, circular DCT, a DCT along an arbitrarily specified contour, etc. The second compression treatment applied to the uncompressed background can use a standard compression technique such as MPEG, JPEG, VC-2, H.265 etc.

For example, when the object is identified as a shape, the processor applies a discrete cosine transform (DCT) compression to the object. The DCT can be a standard DCT, a rectangular DCT, circular DCT, etc. When the object is identified as text, the processor applies optical character recognition to the text to obtain a recognized text, and stores the recognized text using an ASCII encoding. In addition to the ASCII encoding, the compressed text includes information regarding position of the text in the uncompressed data, parallax of the text (i.e. the depth of the text in the uncompressed data), font of the text, and orientation of the text. The compressed text can include additional information regarding the font characteristic, such as serif, san serif, etc.

The processor can calculate an optimal shaped DCT based on the shape of the object, such that the shape of the DCT corresponds to the shape of the object. For example, if the object is identified as a circle, the processor determines that the optimal shaped DCT is a circular DCT. Further, the processor can determine the size of the circular DCT, such that the size of the circular DCT matches the size of the object. Once the processor selects the optimal shaped DCT, the processor compresses the object using the optimal shaped DCT.

In addition to, or instead of the optimal shaped DCT, the processor can use a machine learning selection model, to select the optimal compression treatment for the object. The processor trains the machine learning selection model by providing a plurality of inputs to the machine learning compression model. The plurality of inputs can include various shapes that can be identified such as a house, a person, a car, a fire hydrant, etc. The machine learning selection model outputs the optimal compression treatment for the object, such as a DCT, a standard compression, a specific machine learning compression model, etc.

To train the machine learning selection model, the processor can apply various compression treatments to the object and determine the best compression treatment based on the size of the compressed object, and the difference between the decompressed image of the object and the input image of the object. If there is a difference between the processor selected compression treatment and the machine learning selection model compression treatment, the machine learning selection model is trained to produce the same result as the processor selected compression treatment.

After the processor compresses the uncompressed data by using the multi-pass compression treatment, the processor creates a compressed form, such as a compressed file. The compressed form includes functional information indicating the first compression treatment, the second compression treatment, a location of the object, and a type of the object. The functional information is used by the decoder to uncompress the compressed form and re-create the input uncompressed data. The functional information can be stored in the header of the compressed form. The location of the object can specify the upper left corner of the first pixel associated with the object. More generally, the location of the object can specify a mapping between one or more pixels of the object, and the corresponding pixels in the uncompressed data. The type of the object can specify whether the object is a text or a shape, and if the object is a shape what kind of shape, such as circle, triangle, table, car, etc.

The compressed form can be searched for objects contained in the compressed form. For example, the processor can search the header of the compressed file to determine whether the compressed file contains specific shapes and/or text. In a more specific example, the processor can search for a chair in the compressed file. Further, the processor can perform a string search for a text contained in the compressed file.

Figure 7:
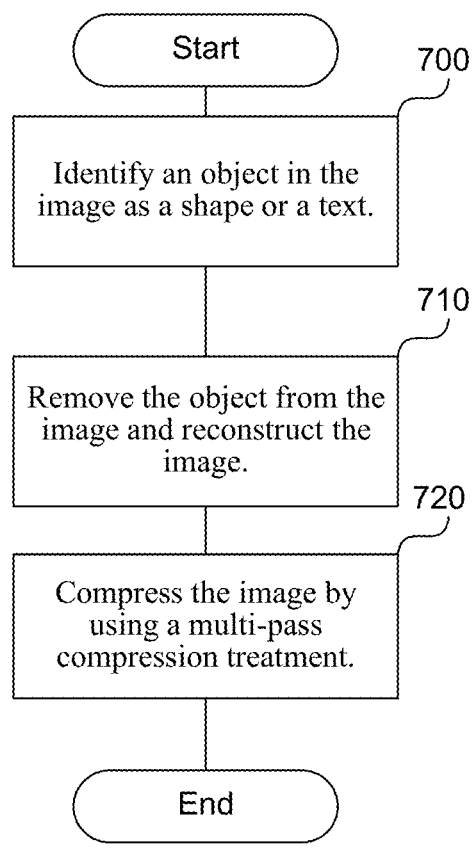
FIG. 7 is a flowchart of a method to efficiently compress an image, according to one embodiment.

FIG. 7 is a flowchart of a method to efficiently compress an image, according to one embodiment. In step 700, at least one processor identifies an object in the image as a shape or a text. The object can be any object that a human observer would identify. The object can be a shape or an alphanumeric character. For example, the shape can be a house, a tree, a sphere, a triangle, a person, etc.

In step 710, the processor removes the object from the image and reconstructs the resulting image in the area occupied by the object. The reconstruction can be done using interpolation, flood filling, in-painting, iterative reconstruction, or other image completion algorithms.

In step 720, the processor compresses the image by using a multi-pass compression treatment. The processor applies a first compression treatment to the object, and applies a second compression treatment to the uncompressed background. The first compression treatment can be at least one of a discrete cosine transform or an ASCII encoding. The second compression treatment can be a standard compression associated with the image such as MPEG, JPEG, VC-2, H.265 etc.

Further, upon compressing the image by using the multi-pass compression treatment, the processor creates a compressed file indicating the first compression treatment, the second compression treatment, location of the object, and type of the object.

Computer

Figure 8:
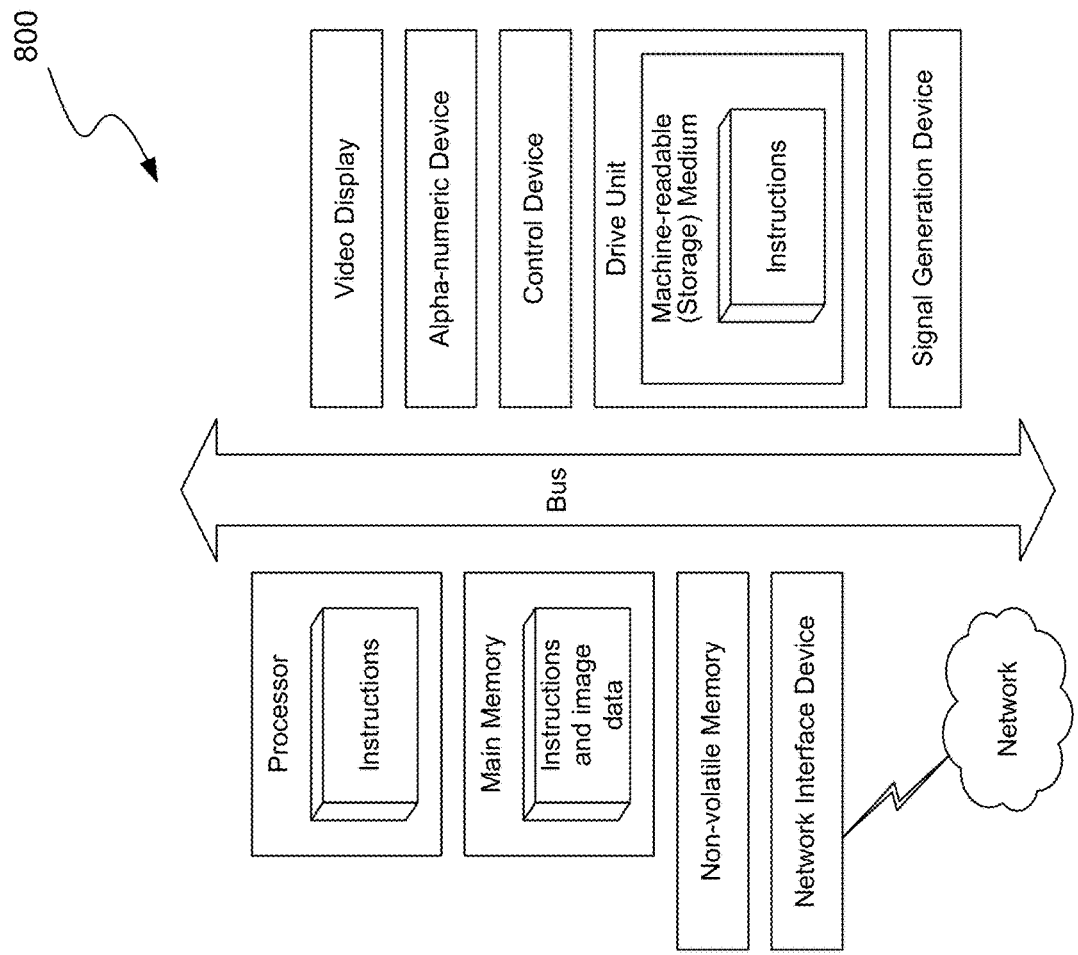
FIG. 8 is a diagrammatic representation of a machine in the example form of a computer system within which a set of instructions, for causing the machine to perform any one or more of the methodologies or modules discussed herein, may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes at least one processor, memory, non-volatile memory, and an interface device. The processor receives the uncompressed data and performs the steps described herein. The processor can implement a machine learning method, using software and/or hardware. The processor can be part of a neural network. The processor can include one or more processors. The processor can be a central processing unit (CPU), a graphics processing unit (GPU), a tensor processing unit (TPU), an application-specific integrated circuit (ASIC), or any combination of these.

Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor. In addition to the software, the memory can also include the image data that needs to be compressed.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A non-transitory computer readable storage medium storing computer program instructions, the computer program instructions when executed by a computer processor causes the computer processor to:
   receive input data;
   identify at least one item in the received input data;
   while generating new data, apply at least one first treatment to the at least one item using a first subset of a plurality of weights;
   calculate a difference between the new data and the input data;
   back propagate information about the calculated difference; and
   while generating an updated version of the new data, update at least one weight of the first subset of weights using the back-propagated information.

2. The non-transitory computer readable storage medium of claim 1, wherein the received input data comprises the at least one item and a background, and the computer program instructions further cause the computer processor to:
   apply a second treatment to the background using a second subset of the plurality of weights to generate a compressed background.

3. The non-transitory computer readable storage medium of claim 1, wherein the computer program instructions further cause the computer processor to:
   apply the at least one first treatment to the at least one item using the at least one updated weight to generate compressed data; and
   process at least the compressed data using a second subset of the plurality of weights to generate the updated version of new data.

4. The non-transitory computer readable storage medium of claim 1, wherein the input data comprises uncompressed data.

5. The non-transitory computer readable storage medium of claim 1, wherein the at least one first treatment comprises at least one compression operation.

6. The non-transitory computer readable storage medium of claim 1, wherein the new data comprises uncompressed data previously subjected to the at least one first treatment.

7. The non-transitory computer readable storage medium of claim 1, wherein the computer program instructions further cause the computer processor to:
   minimize the difference between the new data and the input data by calculating the difference using a squared error differencing method.

8. The non-transitory computer readable storage medium of claim 1, wherein the computer program instructions further cause the computer processor to:
   create a file with functional information for re-creating a version of the received input data.

9. The non-transitory computer readable storage medium of claim 8, wherein the functional information comprises information about the at least one first treatment and information about the at least one item.

10. The non-transitory computer readable storage medium of claim 1, wherein the computer program instructions further cause the computer processor to:
    back propagate the information about the calculated difference through a plurality of interconnected layers of neurons in an artificial neural network.

11. The non-transitory computer readable storage medium of claim 10, wherein the artificial neural network comprises:
    a first layer including one or more first neurons receiving the input data;
    a second layer including one or more second neurons connected to the one or more first neurons via a first subset of connections having the first subset of weights, the second layer storing functional information for re-creating a version of the received input data; and
    a third layer including one or more third neurons generating the new data, the one or more third neurons connected to the one or more second neurons via a second subset of connections having a second subset of the weights.

12. The non-transitory computer readable storage medium of claim 11, wherein a dimensionality of data generated by the second layer is smaller than a dimensionality of the received input data.

13. The non-transitory computer readable storage medium of claim 11, wherein the third layer is configured to:

receive the functional information from the second layer; and generate the version of received input data using the received functional information.

14. A system comprising:
an autoencoder for unsupervised learning of efficient encodings; and
a non-transitory computer-readable medium storing instructions for execution on the autoencoder causing the autoencoder to:
  receive input data,
  identify at least one item in the received input data,
  while generating new data, apply at least one first treatment to the at least one item using a first subset of a plurality of weights of the autoencoder,
  minimize a difference between the new data and the input data,
  back propagate information about the minimized difference through the autoencoder, and
  while generating an updated version of the new data, update at least one weight of the first subset of weights using the back-propagated information.

15. The system of claim 14, wherein the received input data comprises the at least one item and a background, and the instructions further causing the autoencoder to:
  apply a second treatment to the background using a second subset of the plurality of weights to generate a compressed background;
  apply the at least one first treatment to the at least one item using the at least one updated weight to generate at least one compressed item; and
  process the at least one compressed item and the compressed background using a third subset of the plurality of weights to generate the updated version of new data.

16. The system of claim 14, wherein the autoencoder comprises an artificial neural network, and the instructions further causing the autoencoder to back propagate the information about the minimized difference through the artificial neural network.

17. The system of claim 16, wherein the artificial neural network comprises:

a first layer including one or more first neurons receiving the input data;
a second layer including one or more second neurons connected to the one or more first neurons via a first subset of connections having the first subset of weights, the second layer storing functional information for re-creating a version of the received input data; and
a third layer including one or more third neurons generating the new data, the one or more third neurons connected to the one or more second neurons via a second subset of connections having a second subset of the weights.

18. The system of claim 17, wherein:
each first neuron of the first layer is connected to each second neuron of the second layer via a corresponding first connection having a corresponding first weight of the first subset of weights; and
each second neuron of the second layer is connected to each third neuron of the third layer via a corresponding second connection having a corresponding second weight of the second subset of weights.

19. The system of claim 17, wherein:
a number of the one or more first neurons is equal to a number of the one or more third neurons; and
a number of the one or more second neurons is smaller than the number of the one or more first neurons.

20. A method comprising:
receiving input data;
identifying at least one item in the received input data;
while generating new data, applying at least one treatment to the at least one item using a plurality of weights;
calculating a difference between the new data and the input data;
back propagating information about the calculated difference; and
while generating an updated version of the new data, updating at least one weight of the plurality of weights using the back-propagated information.

* * * * *